UNITED STATES PATENT OFFICE.

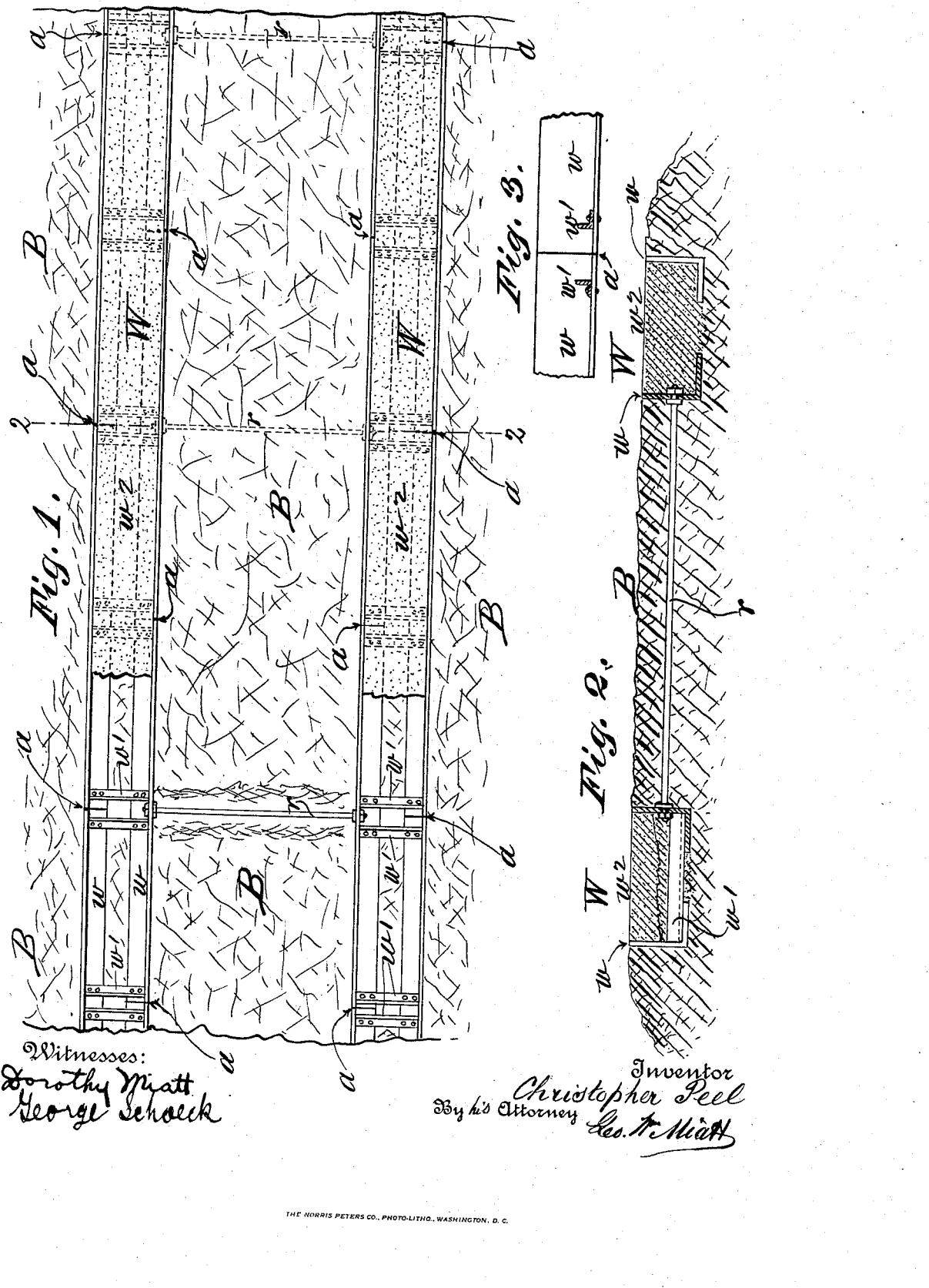

CHRISTOPHER PEEL, OF COSCOB, CONNECTICUT.

VEHICLE-ROAD.

1,201,755.  Specification of Letters Patent.  Patented Oct. 17, 1916.

Application filed August 5, 1916. Serial No. 113,232.

*To all whom it may concern:*

Be it known that I, CHRISTOPHER PEEL, a citizen of the United States, residing at Coscob, in the county of Fairfield and State of Connecticut, have invented certain new and useful Improvements in Vehicle-Roads, of which the following is a specification.

My invention while applicable to vehicle road-ways generally, is designed more especially for use on country and other roads lacking adaptability to automobile traffic, and the traction of heavy vehicles,—the object being to incorporate with and in a relatively loose, soft graded road bed, rigid parallel tracks or runways in such manner that the road bed will be reinforced and rendered more durable while at the same time continuous, even, smooth, hard contact surfaces will be provided for vehicle wheels, thereby further protecting and conserving the road as an entirety, and facilitating and rendering more comfortable traffic thereon.

The invention consists essentially in embedding longitudinally in the graded road bed parallel tracks or wheel-runways the tops of which are flush with the road bed, or substantially so,—each of said tracks being formed of L-shaped side members the horizontal flanges of which are inturned, said side members being braced and spaced apart by intermediate stays rigidly secured thereto, and the longitudinal casings thus formed being filled level with concrete, cement or other plastic material adapted to set, and thus constitute with the rigid casing a relatively hard permanent track or runway for the wheels of vehicles traversing the road,—the parallel tracks thus provided also performing the additional function of confining and sustaining the intermediate central portion of the road-way so as to prevent "wash-outs," lateral displacement and deterioration, and thus afford a sure and safe foot-hold for horses and other animals between said tracks, all as hereinafter more fully set forth.

In the accompanying drawings, Figure 1, is a more or less diagrammatic representation of a top view of a portion of a roadway constructed in accordance with my invention, parts being broken away or removed to show details; Fig. 2, is a transverse sectional elevation taken upon plane of line 2—2, Fig. 1, but on a larger scale, the left hand track being partly broken away to show one of the stays connecting the side members of the casing; Fig. 3, is a detail of the abutting ends of two side members, showing the transverse stays in cross section.

In the drawings B, represents the bed of a country road graded to some extent but otherwise lacking hardness and smoothness sufficient to adapt it to the requirements of automobile and heavy vehicle traffic. In this relatively soft primitive bed (although I do not limit myself in this respect) B, I counter-sink or embed my parallel traction-ways W, W, the distance between their longitudinal centers being equal to the average or standard distance between the wheels on opposite sides of ordinary vehicles. The width of the traction-ways W, W, is preferably sufficient to afford suitable lateral lee-way and to compensate for all variations in the wheel-gage, etc.

The traction-ways W, W, consist of parallel longitudinal casings formed of side members $w$, $w$, rigidly united by cross rods or stays $w'$, $w'$, and a filling $w^2$, of cement, concrete or other suitable material adapted to be applied in a fluid or semi-fluid state or condition, and to set and harden to form a rigid mass practically integral with its casing $w$, $w$, $w'$, $w'$.

The preferred form of casing is that illustrated in the drawings, in which both the side member $w$, $w$, and the connecting stays $w'$, $w'$, consist of rectangular L-shaped angle iron,—the horizontal flanges of the side members $w$, $w$, being inturned toward each other to form more or less of a casing bottom to hold and support the filling $w^2$, in which function they are aided by the cross bars or binders $w'$, $w'$, which are bolted to said horizontal flanges of the side members $w$, $w$, and of which a sufficient number are incorporated in the structure to insure strength and rigidity of casing. At least two of these cross stays or bars $w'$, $w'$, are positioned adjacent to the joints $a$, between the abutting ends of the side pieces $w$, $w$, (one on each side of said joint $a$, as shown in Figs. 1, and 3); and the side pieces $w$, $w$, on one side of the casing are so positioned with relation to those on the other side thereof as to alternate or "break joints" therewith, as may be seen by reference to Fig. 1, thereby distributing any possible lateral strain on the filling $w^2$, which in reality becomes a rigid core uniting and stiffening the several sections of casing.

In situations where the conditions of the road bed render it desirable the parallel traction-ways W, W, may be positively coupled together by means of anchor rods r, r, connected to opposed inner side members w, w, as indicated in Figs. 1, and 2,—said anchor rods r, r, being embedded in the road bed between the traction-ways W, W. In this manner the perfect alinement and parallelism of the traction-ways W, W, may be attained and maintained, and the road bed, especially that portion between the traction-ways W, W, which constitutes the foot-way for horses drawing vehicles over the road, reinforced and conserved intact against lateral spreading, or disintegrating from causes which ordinarily impair the shape and utility of country roads and the like. My country road thus reinforced and stabilized is adapted to all the ordinary requirements of heavy traffic and especially to automobile travel for obvious reasons. Furthermore, it is comparatively inexpensive in initial cost, laying and maintenance,—the filling $w^2$, the upper surface of which is made flush with the tops of the side members w, w, and with the mean surface of the road when the filling is originally applied, being easily re-surfaced and re-leveled to compensate for wear without disturbing the casing or other parts of the road. A country road thus reinforced against "wash-outs" and deterioration would soon save enough over usual cost of maintenance to cover the expense of the traction-ways W, W, which practically render the road permanent in a comparative sense. If preferred the concrete filling may be topped with a softer material, such as a composition containing asphalt or the like, to afford an elastic resilient contact surface.

What I claim as my invention and desire to secure by Letters Patent is,

1. A roadway of the character designated, comprising a relatively soft graded road bed in which are embedded parallel longitudinal wheel traction-ways each consisting of opposed inturned side members L-shaped in cross section braced and spaced apart by medial stays, the longitudinal casings thus formed being filled level with concrete, cement or other suitable material adapted to set and form with the casing a hard, rigid wheel track and road reinforcement, for the purpose set forth.

2. A roadway of the character designated, comprising a relatively soft graded road bed in which are embedded parallel longitudinal wheel traction-ways each consisting of opposed inturned side members L-shaped in cross section braced and spaced apart by medial stays, the longitudinal casings thus formed being filled level with concrete, cement or other suitable material adapted to set and form with the casing a hard, rigid wheel track and road reinforcement, said parallel track casings being coupled together and spaced apart by intermediate anchor rods embedded in the road bed between the traction-ways, for the purpose described.

3. A roadway of the character designated, comprising a relatively soft graded road bed in which are embedded parallel longitudinal wheel traction-ways each consisting of suitable lengths of opposed inturned side members L-shaped in cross section, said side members overlapping or breaking joints as related to each other and being braced and spaced apart by medial stays, and the longitudinal casings thus formed being filled level with concrete, cement or other suitable material adapted to set and form with the casing a hard, rigid wheel track and road reinforcement, for the purpose set forth.

4. A roadway of the character designated, comprising a relatively soft graded road bed and parallel traction-ways embedded therein consisting of longitudinal casings filled level with cement, concrete or other suitable material adapted to set and form a rigid structure having a hard relatively smooth surface adapted to wheel traffic, for the purpose described.

CHRISTOPHER PEEL.

Witnesses:
  Geo. Wm. Miatt,
  Dorothy Miatt.

Copies of this patent may be obtained for five cents each, by addressing the "Commissioner of Patents, Washington, D. C."